United States Patent [19]

Sato

[11] Patent Number: 5,228,639

[45] Date of Patent: Jul. 20, 1993

[54] FISHING REEL WITH CLUTCH CONTROL MEMBER

[75] Inventor: Jun Sato, Sakai, Japan

[73] Assignee: Shimano, Inc., Osaka, Japan

[21] Appl. No.: 870,116

[22] Filed: Apr. 17, 1992

Related U.S. Application Data

[63] Continuation of Ser. No. 630,233, Dec. 19, 1990, abandoned.

[51] Int. Cl.⁵ .................................................. A01K 89/015
[52] U.S. Cl. ...................................... 242/262; 242/310
[58] Field of Search ............ 242/259, 260, 261, 262, 242/310

[56] References Cited

U.S. PATENT DOCUMENTS

| 1,189,232 | 7/1916 | Benjamin | 242/261 |
|---|---|---|---|
| 1,463,828 | 8/1923 | Malleson | 242/260 |
| 4,520,971 | 6/1985 | Nagata | 242/261 |
| 4,593,869 | 6/1986 | Yasui et al. | 242/261 |
| 4,666,101 | 5/1987 | Atobe | 242/261 |
| 4,674,699 | 6/1987 | Fukushima et al. | 242/261 |
| 4,697,760 | 10/1987 | Aoki | 242/261 |
| 4,798,355 | 1/1989 | Kaneko | 242/261 |
| 4,819,893 | 4/1989 | Ueno | 242/261 |
| 4,824,046 | 4/1989 | Emura et al. | 242/261 |
| 4,919,360 | 4/1990 | Roberts | 242/260 |

FOREIGN PATENT DOCUMENTS 59-192031  10/1984  Japan .

Primary Examiner—Katherine Matecki
Attorney, Agent, or Firm—Dickstein, Shapiro & Morin

[57] ABSTRACT

A fishing reel having a spool rotatable for winding a fishing line thereabout, a clutch for freely setting a revolution of the spool and a clutch control member for operating the clutch. The clutch control member is movable up and down as the reel is attached to a fishing rod held in a horizontal posture. A moving path of the clutch control member is curved concave facing a handle end of the fishing rod relative to a side view of the fishing rod held in the horizontal posture and attached with the reel.

2 Claims, 4 Drawing Sheets

FISHING REEL WITH CLUTCH CONTROL MEMBER

This application is a continuation of application Ser. No. 07/630,233 filed Dec. 19, 1990, now abandoned.

BACKGROUND OF THE INVENTION

1. Field of the Invention

The present invention relates to a fishing reel, and more particularly to a fishing reel having a spool rotatable for winding a fishing line thereabout and a clutch and a clutch control member for freely setting a revolution of the spool.

2. Description of the Related Art

A typical fishing reel of the above-noted type is known from e.g. Japanese laid-open patent gazette No. 59-192031. With this reel, a user sets the spool freely rotatable by pushing down, by means of the thumb, the clutch control member disposed rearwardly of the spool along a side face of the reel body.

However, the above manner of action provides the user with a unnatural operating feel.

Therefore, the primary object of the invention is to overcome this problem through improvement achieved through ergonomic study of the posture and motions of the user's hand holding the fishing rod. The improvement enables the user to operate the clutch control member in a more natural and comfortable manner.

SUMMARY OF THE INVENTION

For accomplishing the above-described object, a fishing reel according to the present invention comprises: a spool rotatable for winding a fishing line thereabout; a clutch for freely setting a revolution of the spool; and a clutch control member for operating the clutch; wherein the clutch control member is movable up and down as the reel is attached to a fishing rod held in a horizontal posture; a moving path of said clutch control member is curved concave facing rearwardly, i.e., toward the handle end of the fishing rod relative to a side view of the fishing rod held in said posture and attached with the reel.

Functions and effects of the above construction will now be described.

Let us assume now that the clutch control member is to actuate the clutch for temporarily breaking power transmission to the spool. For casting the line, the user first uses his right thumb to push down the control member for rendering the spool freely rotatable. Then, as the user delivers the line from the spool by swinging the rod, he lightly keeps his right thumb on either the outer periphery of the spool or on the line wound about the spool. This action is commonly referred to as "thumbing". The thumbing action prevents inertia rotation of the spool thus appropriately restricting the length of the line to be delivered from the reel.

In the above-described action, the clutch control member is moved along an arcuate path having its axis adjacent the spool shaft in the side view. Whereas, the user swings his thumb positioned rearwardly of the control member about the pivot of the thumb joint, i.e. the axis positioned opposite to the spool relative to the control member. This gives the user uncomfortable and unnatural operating feel. For overcoming this problem, the invention provides the above-described features. Namely; according to the features, a) The moving path of the clutch control member is curved concave facing a handle end of the fishing rod relative to a side view of the fishing rod held in the horizontal posture and attached with the reel. This ergonomic arrangement can provide the user with natural and comfortable operating feel.

b) The clutch control member is disposed rearwardly of the spool and also the spool is rendered freely rotatable by a push-down operation of this clutch control member. This arrangement enables the user to shift his thumb for a thumbing action, after casting the line, without significantly changing his rod gripping hand posture. That is, with the conventional reel, the user has to change his gripping posture for a thumbing operation since the moving paths of the thumb and the control member significantly differ from each other. On the other hand, the above feature of the present invention minimizes the difference between the moving paths of the thumb and the control member. The user can smoothly shift from the declutching operation to the subsequent thumbing operation only with a downward movement of his thumb without displacing the same back and forth.

In short, the above feature a) achieves a natural and comfortable operating feel of the clutch control member. Wheareas, the feature b) achieves a smooth shifting from the declutching operation to the thumbing operation.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing reel relating to the present invention; in which.

DESCRIPTION OF THE PREFERRED EMBODIMENTS

Figure 1:
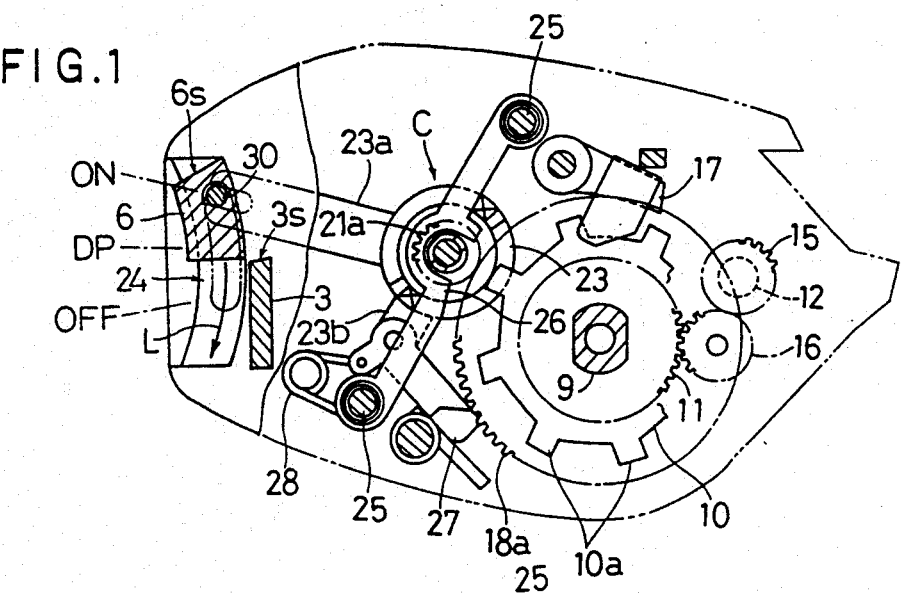
FIG. 1 is a side view of a transmission mechanism where its clutch is engaged for allowing force transmission.

Preferred embodiments of the present invention will now be described in particular with reference to the accompanying drawings.

FIGS. 1 through 5 show a double-bearing type fishing reel relating to the first embodiment. As this fishing reel is attached to a fishing rod 1, a level wind mechanism A, a spool 2, and a thumb rest 3 are disposed in the forward-to-rearward direction in this order, with these members being bound between a pair of right and left side members 4 and 5. Further, rearwardly of the thumb rest 3, there is disposed a push knob 6 to be pushed down for setting the spool 2 freely rotatable. To an outside face of the right side member 5, there are attached a line-winding handle 7 and a star-shaped drag adjuster member 8.

Figure 4:
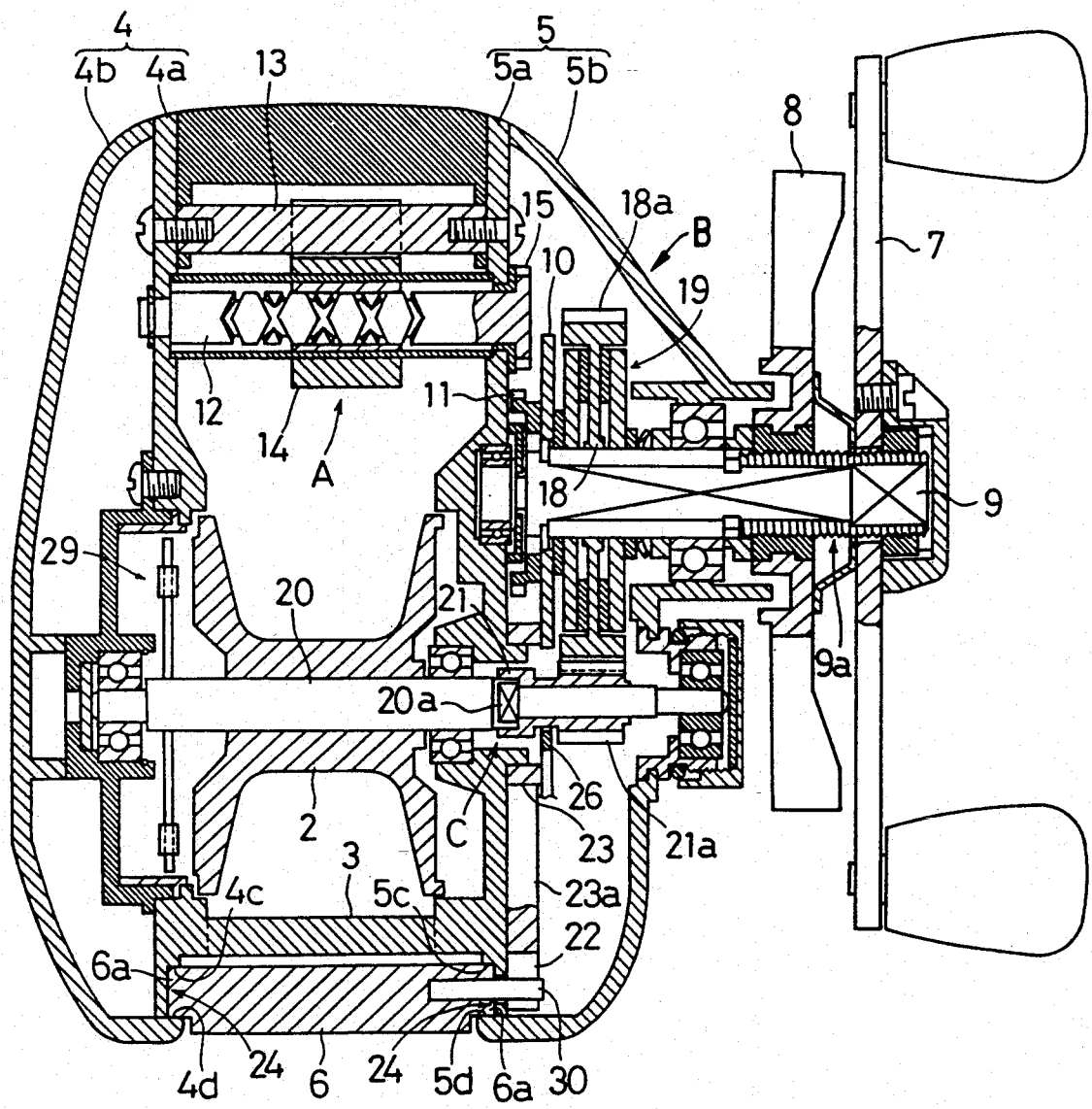
FIG. 4 is a sectional plane view of the transmission mechanism where the clutch is engaged for force transmission.
Figure 5:
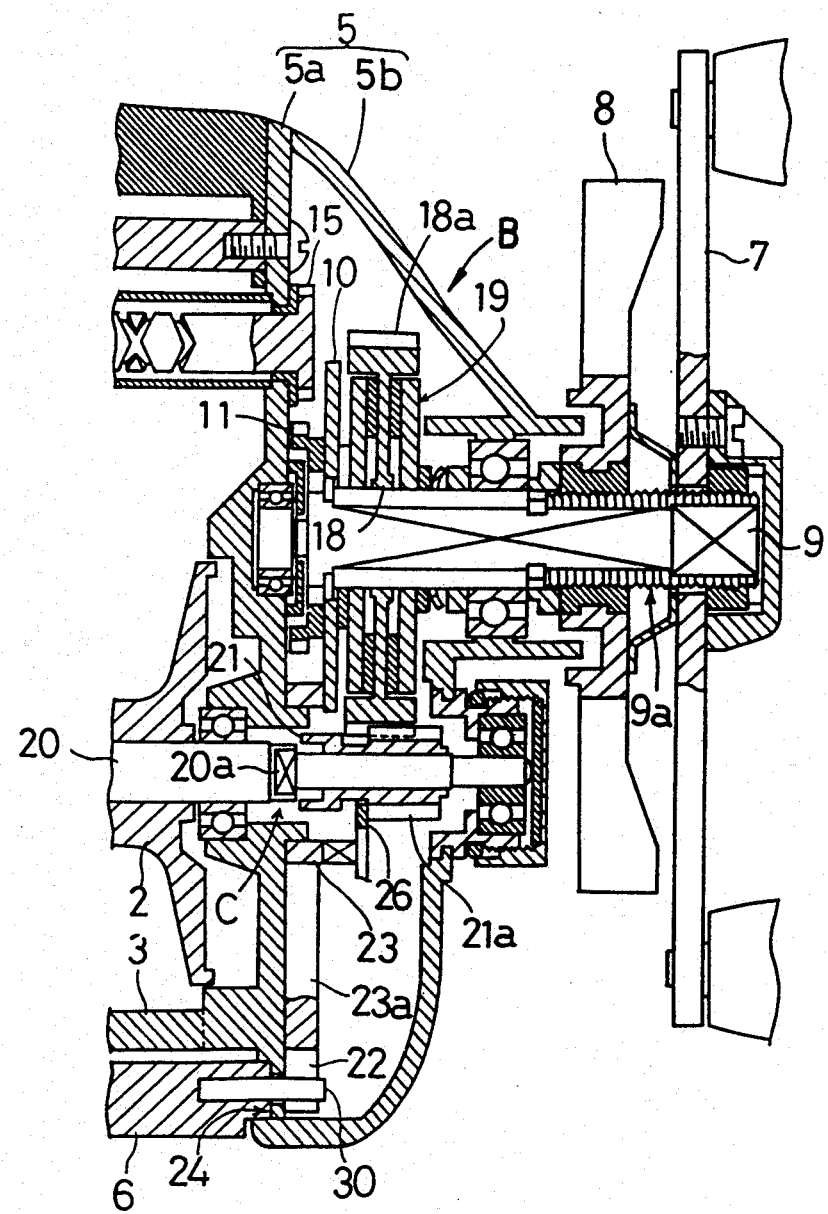
FIG. 5 is a sectional plane view of the transmission mechanism where the clutch is disengaged for breaking the force transmission.

As shown in FIG. 4, the side members 4, 5 include side plates 4a, 5a and outer wall elements 4b, 5b, respectively. A rotary shaft 9 operatively connected with the handle 7 is inserted through a gap formed between the right side plate 5a and the outer wall element 5b.

The drag adjuster member 8 is screw-connected on a threaded portion 9a formed at an outer end of the rotary shaft 9. On the inner side of the rotary shaft 9, there are provided a drag mechanism B, a ratchet wheel 10 and a gear 11 for transmitting force to the level wind mechanism A.

In the level wind mechanism A, a rotary motion of a screw shaft 12 causes a reciprocating motion of a line guide member 14 along a guide rod 13. Further, the force from the gear 11 is transmitted through an intermediate gear 16 to a gear 15 fitted on a terminal end of the screw shaft 12 of the level wind mechanism A.

The ratchet wheel 10 has a plurality of teeth projecting radially. Also, a claw member 17 urged for engagement with one of gear teeth 10a is disposed adjacent the ratchet wheel 10 in order to prevent reverse rotation of this ratchet wheel 10.

The rotary shaft 9 loosely mounts a free disc 18 having an output gear 18a at an outer periphery thereof. The aforementioned drag mechanism B is disposed across this free disc 18 and includes a pair of friction plates 19 fitted on the rotary shaft 9 for transmitting torque thereto. In operation of this drag mechanism B, adjustment of frictional force is effected through adjustment of contact force which in turn is effected through a rotary operation of the drag adjuster member 8.

The spool 2 has a pivot shaft 20 rotatable in unison therewith. The pivot shaft 20 forms, at an intermediate portion thereof, an engaging portion 20a. Further, this pivot shaft 20 loosely mounts a slide member 21 disengageably engageable with the engaging portion 20a. This slide member 21 includes an input gear 21a which is engageable with an output gear 18a of the free disc 18. Accordingly, if the handle 7 is driven to rotate with the slide member 21 being engaged with the engaging portion 20a, the spool 2 is rotated for taking up a fishing line about the spool 2.

In the course of this line taking-up operation, the level wind mechanism A acts to render the amount of the taken line uniform sidewise. Also, the ratchet wheel 10 acts to prevent reverse rotation of the handle 7.

Figure 2:
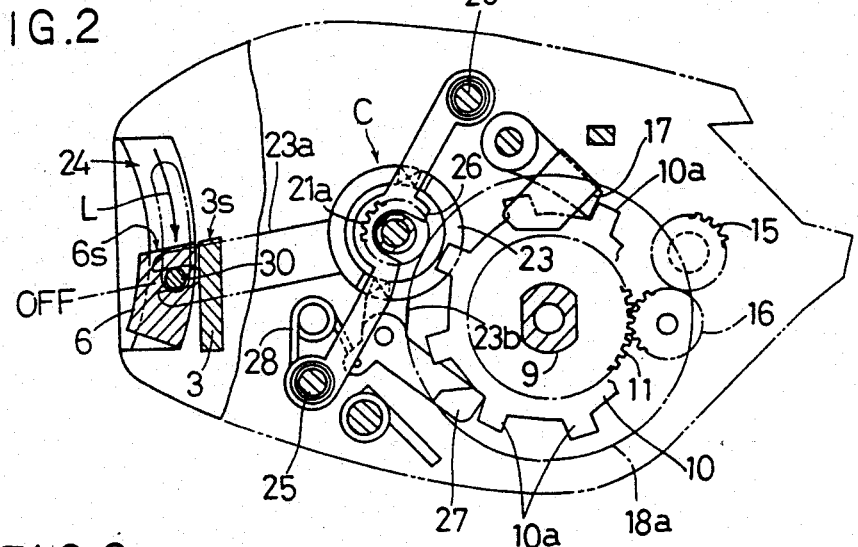
FIG. 2 is a side view of the transmission mechanism where the clutch is disengaged for breaking the force transmission.

The above-described slide member 21 and the engaging portion 20a together constitute a clutch C. For a line casting operation, first, the slide member 21 is set to a transmission-breaking position of the clutch C, which position is shown in FIG. 2. Thereafter, the user swings the fishing rod 1 for delivering the line from the reel as the spool 2 is rotated freely because of tension of the fishing line.

Figure 6:
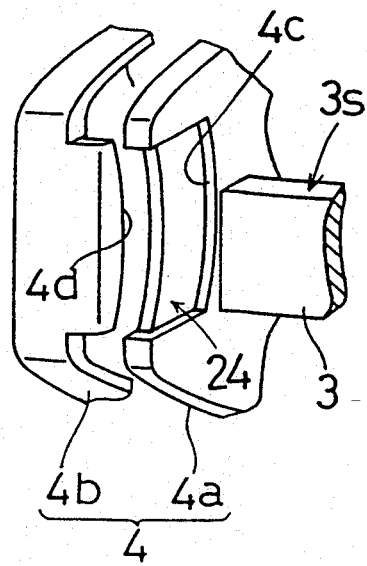
FIG. 6 is a perspective view of essential portions showing guide grooves in particular.

In the particular embodiment, the free rotation setting operation of the spool 2, i.e. the disengaging operation of the clutch C, is effected by a push down operation of the push knob 6. More particularly, as shown in FIGS. 1 and 2, rearwardly of the thumb rest 3, the push knob 6 is provided as the clutch control member slidable up and down along an arcuate moving path L formed concave relative to the handle end of the fishing rod 1 as viewed sidewise. For rendering this push knob 6 slidable, its right and left arcuate projections 6a, 6a are slidably fitted in guide grooves 24, 24 (see FIG. 6) of abutment portions 4c, 4d, 5c, 5d formed by the right and left side plates 4a, 5a and the right and left outer wall members 4b and 5b.

At the right projection 6a of the push knob 6, there is projectingly inserted a control pin 30 movable sidewise, and this control pin 30 is engaged with a cutout groove 23 defined at a top of an arm 23a of a ring-shaped cam 22 supported pivotably about the same shaft of the pivot axis 20 of the spool 2. Further, the slide member 21 is engaged with a shifter 26 positioned in parallel with the pivot shaft 20 and movable along shafts 25 disposed approximately upwardly and downwardly of the pivot shaft 20, respectively. An arm portion 23b of the ring-shaped cam 23 pivotably supports a swing element 27. A toggle spring 28 is provided for switching over positions of this swing element 27, i.e. one position engaged with one of the gear teeth 10a and the other position disengaged therefrom.

Accordingly, if the push knob 6 is pushed downwards beyond a dead point DP, this knob 6 is moved to its bottom stroke end by means of the urging force of the toggle spring 28 for setting the spool 2 freely rotatable.

Figure 3:
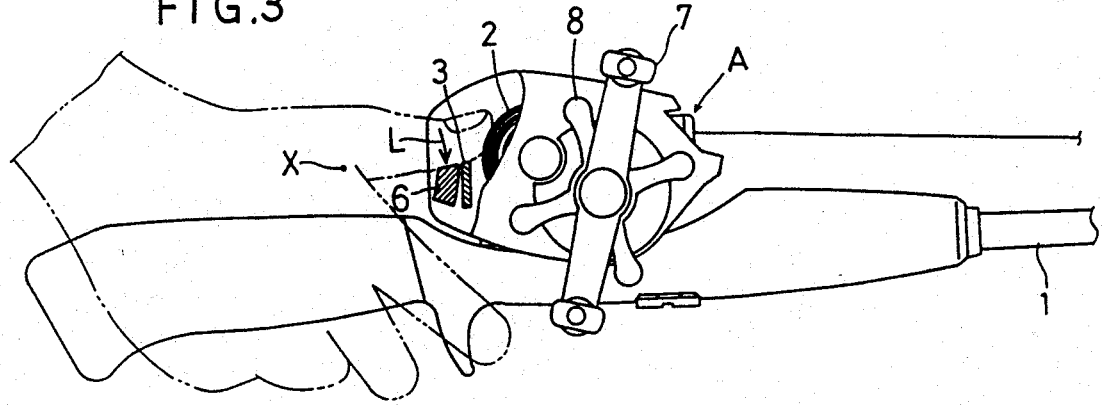
FIG. 3 is a side view illustrating a clutch operation with the reel being attached to a fishing rod.

With this fishing reel, the push knob 6 is normally operated with the right thumb of the user. As shown in FIG. 3, the guide groove 24 for guiding the vertical movement of the push knob 6 has its virtual center X so positioned as to approximately correspond to the root pivot of the user's thumb. Accordingly, the vertical movement of the push knob 6 approximately corresponds to the pivotal movement of the thumb, thus enabling the user to operate the clutch C with a smooth and natural feel.

When the push knob 6 is set to a position ON for engaging the clutch C for allowing force transmission, an upper surface 6s of the push knob 6 is positioned higher than an upper surface 3s of the thumb rest 3. On the other hand, when the knob 6 is set to a further position OFF for disengaging the clutch C for breaking force transmission, the above upper surfaces 6s and 3s are positioned at approximately the same level. Accordingly, in the latter case of disengaging the clutch C, i.e. when the spool 2 is set freely rotatable, after operating the push knob 6 with the right thumb, the user can smoothly and easily effect the thumbing operation by bringing the top of the right thumb into contact with the spool 2 or the line wound about the spool 2 while keeping the thumb on the upper surface 3s of the thumb rest 3 and the upper surface 6s of the push knob 6 without significantly changing the posture of the right thumb.

Also, with this fishing reel, if the handle 7 is rotated when the push knob 6 is set at the OFF position, the swing element 27 is pushed back by the rotational force of the tooth 10a, thus returning the knob 6 to its home position, i.e. its ON position.

A reference numeral 29 denotes a centrifugal force brake for preventing a backlash rotation of the spool associated with a delivery of the fish line from the reel.

Some other embodiments will now be described next.

Figure 7:
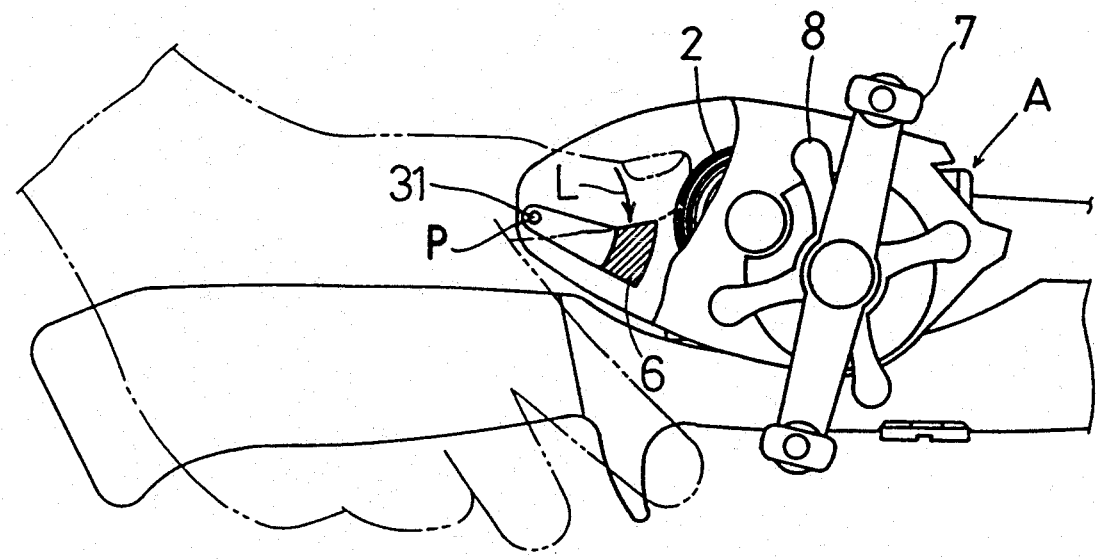
FIG. 7 is a side view showing a moving mechanism for a control member according to a further embodiment of the invention.

I. As shown in FIG. 7, it is conceivable to dispose a pivot shaft 31 at the rear ends of the side members 4 and 5 extending rearwardly, while disposing the control member 6, pivotable about the axis P of this pivot shaft 31, forwardly of the pivot shaft 31.

II. The present invention is applicable also to a fishing reel without the thumb rest.

III. The moving path L can be of any other curved shape, such as an elliptical shape or a quadratic curved shape and so on.

The invention may be embodied in order specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:

a reel body including right and left side plates and right and left outer wall members;

a spool rotatable for winding a fishing line thereabout and for thereby pulling the fishing line generally in a rearward direction toward a user;

rotating means for rotating the spool, said rotating means including a handle with a rotary shaft;

a clutch for selectively disengaging the spool from the rotating means and for thereby allowing the spool to rotate freely;

a thumb rest for supporting the user's thumb, said thumb rest being located on the reel body rearwardly of the spool;

guide grooves formed at right and left positions of a rear portion of the reel body, said guide grooves being opposed to each other and being formed by said right and left side plates and said right and left outer wall members, said grooves extending substantially normal to the axis of a fishing rod when said fishing reel is attached to said fishing rod, each of said guide grooves being curved concave facing the rearward direction; and a clutch control member for operating the clutch, said clutch control member being located rearwardly of and close to the thumb rest such that the clutch control member is in position to be operated by the user's thumb, said clutch member including right and left ends, and arcuate projections formed at said right and left ends of said clutch control member, said projections being slidably fitted into said guide grooves; and wherein said arcuate projections of said clutch control member are slidable within said guide grooves such that said clutch control member is slidably movable along a concave moving path; and wherein said moving path of said clutch control member is curved concave facing the rearward direction, whereby said moving path is located along a natural path of movement for the user's thumb.

2. A fishing reel as defined in claim 1, further comprising a ring-shaped cam, and a rotary axial spool shaft, said cam being pivotably supported about a pivot axis which is coincident with the axial spool shaft, said cam having an arm with a top portion, and wherein the top portion of the arm has a cutout groove, and wherein said right projection of the clutch control member has a control pin inserted therein, said control pin being engaged with the cutout groove.

* * * * *